US012598052B2

(12) United States Patent
Abe

(10) Patent No.: US 12,598,052 B2
(45) Date of Patent: Apr. 7, 2026

(54) SYNCHRONOUS COMMUNICATION APPARATUS, CONTROL METHOD OF THE SAME AND STORAGE MEDIUM

(71) Applicant: CANON KABUSHIKI KAISHA, Tokyo (JP)

(72) Inventor: Mitsumasa Abe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 18/540,622

(22) Filed: Dec. 14, 2023

(65) Prior Publication Data

US 2024/0204980 A1     Jun. 20, 2024

(30) Foreign Application Priority Data

Dec. 19, 2022     (JP) ................................. 2022-201878

(51) Int. Cl.
*H04L 7/04*          (2006.01)
*H04L 7/00*          (2006.01)
(52) U.S. Cl.
CPC .......... *H04L 7/0012* (2013.01); *H04L 7/0087* (2013.01)

(58) Field of Classification Search
CPC ...... H04L 7/0012; H04L 7/0087; G01S 19/29
USPC ........ 375/262, 369, 356, 354, 373, 375, 376
See application file for complete search history.

(56) References Cited

U.S. PATENT DOCUMENTS

2020/0052875 A1 *   2/2020   Scarpa ................... G01S 19/29

FOREIGN PATENT DOCUMENTS

JP          2018191226 A     11/2018

* cited by examiner

*Primary Examiner* — Phuong Phu
(74) *Attorney, Agent, or Firm* — Canon U.S.A., Inc. IP Division

(57)          ABSTRACT

A synchronous communication apparatus includes an output unit configured to output a current time for synchronizing with another communication apparatus, a generation unit configured to generate a synchronous pulse at a predetermined frequency, and a change unit configured to, if a set time that is set as a time at which the generation unit starts generation of the synchronous pulse is not a time later than the current time, change the set time to a time later than the current time.

10 Claims, 7 Drawing Sheets

SYNCHRONOUS COMMUNICATION APPARATUS, CONTROL METHOD OF THE SAME AND STORAGE MEDIUM

BACKGROUND OF THE DISCLOSURE

Field of the Disclosure

The present disclosure relates to a synchronous communication apparatus, a control method of the same, and a storage medium.

Description of the Related Art

In recent years, there have been used in many fields, technologies for operating a plurality of devices as a large system by achieving synchronization between the plurality of devices. As examples of such technologies, there are Stadium Vision and Volumetric Studio for creating a free viewpoint video by using images captured by a plurality of cameras of which the clocks are synchronized with each other and switching to an image from any viewpoint in real time. In order to obtain a high-quality free-viewpoint video, the cameras need to be accurately synchronized in imaging timing. Precision Time Protocol (PTP) is widely used as a technique for time synchronization between communication terminals that control respective cameras, and Pulse Per Second (PPS) or GenLock is widely used for time synchronization between the communication terminals and the cameras. Since the internal clocks of the communication terminals may include errors such as jitter, a time server that has a high-accuracy clock and distributes its own time, such as Global Positioning System (GPS), is used as a reference for making synchronous pulses uniform.

There is a method for generating a synchronous pulse using a counter. The internal clocks of the communication terminals are counted, the counted values (counter values) are compared with a prescribed value to switch between "0" and "1" of the output (synchronous pulse), and a predetermined value is added to the prescribed value. This process is repeated to generate a periodic signal (synchronous pulse). The counter values are incremented or decremented (corrected) as appropriate to be uniform between the plurality of communication apparatuses, so that synchronous pulses that are periodic signals of which the phases are the same between the plurality of communication terminals can be obtained. A time synchronization protocol such as PTP is used to share the time for correcting the counter values.

Japanese Patent Application Laid-Open No. 2018-191226 discusses a synchronous communication system that acquires a time from a time server to synchronize counter values with the time, and acquires errors between the time at the time server and the counter values, and generates and outputs synchronous pulses at a timing that can be adjusted on the basis of the errors.

To start output of synchronous pulses in such a synchronous communication system, a synchronous pulse output start time (hereinafter, referred to as "start time") is externally set to the synchronous communication apparatuses. Since the synchronous communication apparatuses are time-synchronized with the time server, the synchronous communication apparatuses output synchronous pulses simultaneously at a timing at which the start time has come.

However, in the synchronous communication system discussed in Japanese Patent Application Laid-Open No. 2018-191226, if a synchronous communication apparatus is added to the synchronous communication system in which a plurality of synchronous communication apparatuses has output synchronous pulses, a start time will be newly set to the added synchronous communication apparatus. In this case, the added synchronous communication apparatus cannot output a synchronized pulse if the newly set start time is a start time that is shifted in phase from the synchronous pulses having been already output from the plurality of synchronous communication apparatuses. Even if the start time of the currently synchronized synchronous pulses is set to the added synchronous communication apparatus so as to set a start time that is not shifted in phase, the start time is a time in the past and thus the added synchronous communication apparatus cannot output a synchronous pulse.

For the above-described reason, it is difficult to assure that the added synchronous communication apparatus can output a synchronized pulse, and it is necessary to perform again the synchronous pulse output process on all the synchronous communication apparatuses including the added synchronization communication apparatuses.

SUMMARY OF THE DISCLOSURE

To solve the above-described issue, the present disclosure is directed to providing a synchronous communication apparatus that can be efficiently synchronized with other synchronous communication apparatuses.

According to an aspect of the present disclosure, a synchronous communication apparatus includes an output unit configured to output a current time for synchronizing with another communication apparatus, a generation unit configured to generate a synchronous pulse at a predetermined frequency, and a change unit configured to, if a set time that is set as a time at which the generation unit starts generation of the synchronous pulse is not a time later than the current time, change the set time to a time later than the current time.

Further features of the present disclosure will become apparent from the following description of exemplary embodiments with reference to the attached drawings.

DESCRIPTION OF THE EMBODIMENTS

Hereinafter, exemplary embodiments will be described in detail with reference to the accompanying drawings. The following exemplary embodiments are not intended to limit the present disclosure according to the claims. The exemplary embodiments include a plurality of features, but all the plurality of features are not necessarily essential to the present disclosure, and the plurality of features may be combined arbitrarily. In the accompanying drawings, identical or similar components are given identical reference signs, and redundant description thereof will be omitted.

A first exemplary embodiment of the present disclosure will be described with reference to FIGS. 1 to 6.

Figure 1:
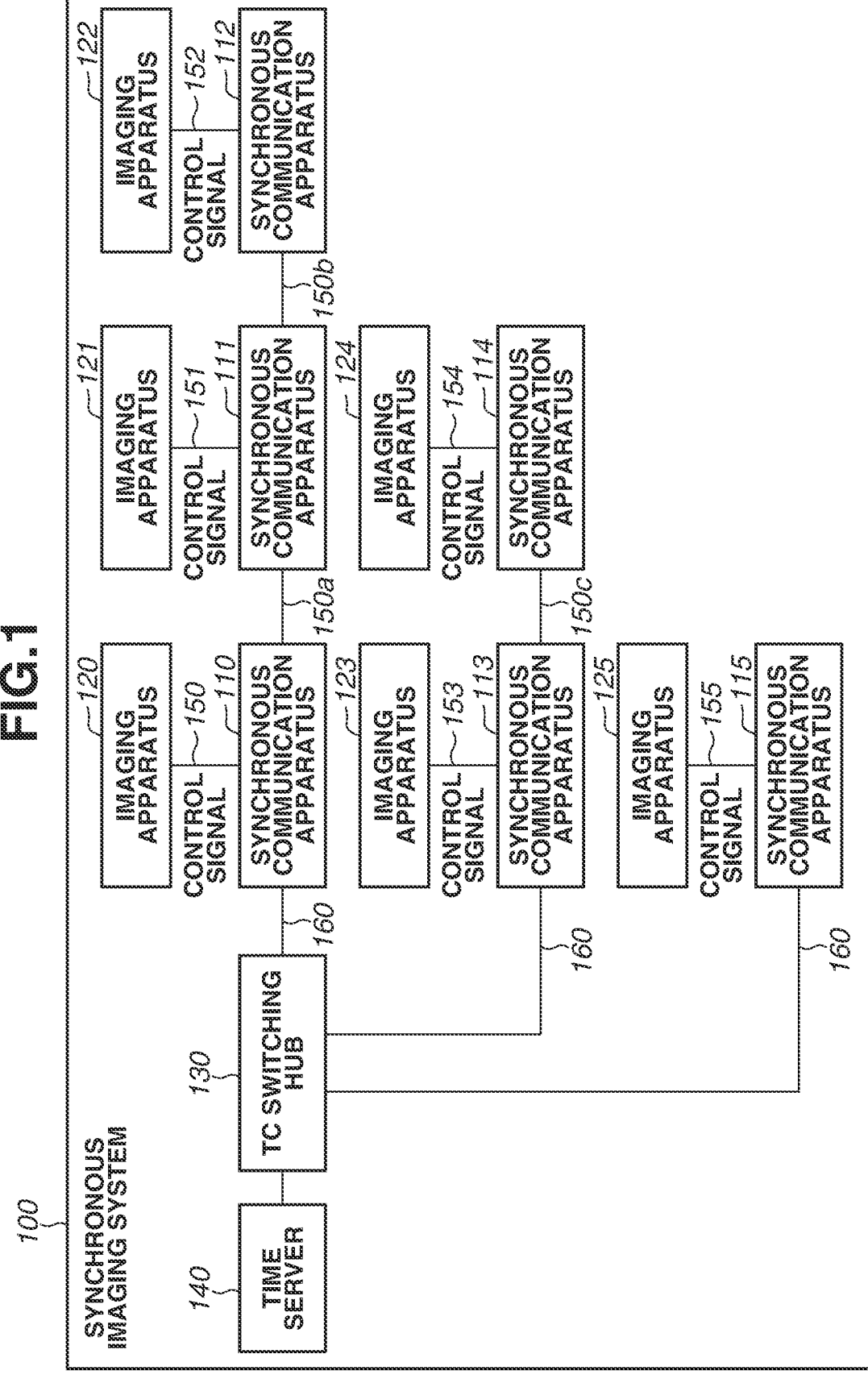
FIG. 1 is a diagram illustrating a synchronous imaging system according to a first exemplary embodiment of the present disclosure.

FIG. 1 illustrates a configuration example of a synchronous imaging system 100 in the first exemplary embodiment. The synchronous imaging system 100 includes synchronous communication apparatuses 110, 111, 112, 113, 114, and 115, imaging apparatuses 120, 121, 122, 123, 124, and 125, a Transparent Clock (TC) switching hub 130, and a time server 140. The imaging apparatuses 120 to 125 are cameras or the like having the function of capturing still images and moving images and the function of recording sounds. The synchronous imaging system 100 may further include a control terminal (not illustrated) connected to the TC switching hub 130 and an image accumulation server (not illustrated) connected to the TC switching hub 130. Although FIG. 1 illustrates only one time server 140, the synchronous imaging system 100 may use a plurality of time servers 140 to secure redundancy. One or more synchronous communication apparatuses may be connected to the right side of the synchronous communication apparatus 112, and one or more synchronous communication apparatuses may be connected to the right side of the synchronous communication apparatus 114. The synchronous imaging system 100 is an example of a synchronous communication system.

The time server 140 is connected to the TC switching hub 130. The TC switching hub 130 is connected in parallel with the synchronous communication apparatuses 110, 113, and 115 via a network 160. The synchronous communication apparatus 110 is connected in series with the synchronous communication apparatus 111 via a network 150a, and the synchronous communication apparatus 111 is connected in series with the synchronous communication apparatus 112 via a network 150b. The synchronous communication apparatus 113 is connected in series with the synchronous communication apparatus 114 via a network 150c. In the following description, the networks 150a to 150c will also be collectively referred to as networks 150.

The synchronous communication apparatus 110 is connected to the imaging apparatus 120. The synchronous communication apparatus 111 is connected to the imaging apparatus 121. The synchronous communication apparatus 112 is connected to the imaging apparatus 122. The synchronous communication apparatus 113 is connected to the imaging apparatus 123. The synchronous communication apparatus 114 is connected to the imaging apparatus 124. The synchronous communication apparatus 115 is connected to the imaging apparatus 125. The synchronous communication apparatuses 110 to 115 and the imaging apparatuses 120 to 125 are connected in a wireless or wired manner.

In the present exemplary embodiment, the time information of the time server 140 is transmitted to the synchronous communication apparatuses 110, 113, and 115 via the TC switching hub 130 capable of time synchronization. The time information of the time server 140 may be transmitted directly to the synchronous communication apparatuses 110, 113, and 115 without the TC switching hub 130.

The synchronous communication apparatuses 110 to 115 are time-synchronized via the networks 150 (150a to 150c) and 160, and transmit and receive data to and from one another. The networks 150 and 160 are networks in conformity with Ethernet®, for example. More specifically, the networks 150 and 160 are IEEE standard-compliant Gigabit Ethernet (GbE), 10 GbE, or 100 GbE, for example. The networks 150 and 160 may be configured by combining an interconnect (InfiniBand), industrial Ethernet, and the like. The networks 150 and 160 are not limited to these examples but may be other types of communication networks.

The time server 140 is a server that internally has an accurate clock (has an accurate time), and distributes its time using a synchronization protocol. The time source of the time server 140 may be a Global Positioning System (GPS), an atomic clock, or the like, but is not limited to them. The time source of the time server 140 may be any source as long as it is higher in accuracy than the synchronous communication apparatuses 110 to 115 and may be an Oven Controlled Crystal Oscillator (OCXO), or the like. In the present exemplary embodiment, the synchronization protocol is Precision Time Protocol (PTP). The synchronization protocol may be a synchronization protocol using Audio Video Bridging (AVB) signals, Pulse Per Second (PPS) signals or the like of the IEEE802.1 standard.

The synchronous communication apparatuses 110 to 115 all have the same configuration. The synchronous communication apparatuses 110 to 115 internally have respective clocks, update their own time using the time synchronization protocol, and transmit control signals 150 to 155 to the imaging apparatuses 120 to 125, respectively. While the time synchronization protocol cannot be received from the time server 140, the synchronous communication apparatuses 110 to 115 use their own clocks to maintain synchronous signals in the control signals 150 to 155. Taking the synchronous communication apparatus 111 as an example, the synchronous communication apparatus 111 is connected to the preceding synchronous communication apparatus 110 and the subsequent synchronous communication apparatus 112 to transmit and receive the time information and image data thereto or therefrom. The synchronous communication apparatus 111 sends to the imaging apparatus 121 connected to the synchronous communication apparatus 111 a synchronous signal generated on the basis of the time information from the preceding synchronous communication apparatus 110 and the subsequent synchronous communication apparatus 112.

The synchronous communication apparatuses 110, 111, and 112 are daisy-chained. The synchronous communication apparatuses 113 and 114 are also daisy-chained. As illustrated in FIG. 1, the present exemplary embodiment is applicable to a plurality of daisy chains as in the synchronous communication apparatuses 110 to 112 and the synchronous communication apparatus 113 and 114, and to a star connection using the TC switching hub 130 as in the synchronous communication apparatuses 110, 113, and 115. To secure redundancy, the connections (the networks 150) of the synchronous communication apparatuses 110 to 115 may be duplicated.

The TC switching hub 130 is a hub that connects the time server 140 and the connection destinations (the synchronous communication apparatuses 110, 113, and 115) while maintaining the synchronization protocol. The TC switching hub 130 is necessary when a plurality of time servers 140 is used or when the synchronous communication apparatuses 110, 113, and 115 are star-connected. If the time server 140 has a plurality of ports (for example, three ports) and directly connects to the synchronous communication apparatuses 110, 113, and 115, the TC switching hub 130 may not be provided.

The imaging apparatuses 120 to 125 receive the control signals (control information) 150 to 155 from the synchronous communication apparatuses 110 to 115, and transmit synchronous captured image data on the basis of the synchronous signals in the control signals 150 to 155 to the synchronous communication apparatuses 110 to 115. The imaging apparatuses 120 to 125 internally have respective clocks and update their own times on the basis of the control signals 150 to 155, respectively. The imaging apparatuses 120 to 125 have respective synchronous signal reception timings (synchronous signal reception periods) for the synchronous signals in the control signals 150 to 155, and synchronize with the synchronous communication apparatuses 110 to 115 upon receiving the synchronous signals during the synchronous signal reception periods. The imaging apparatuses 120 to 125 may each include a ranging sensor such as Light Detection and Ranging (LiDAR) sensor or Radio Detecting and Ranging (RADAR) sensor. The imaging apparatuses 120 to 125 need not have an identical configuration but may be apparatuses of different models, for example.

Unless otherwise specified, the term "image" used in the present exemplary embodiment includes the concepts of a moving image and a still image. That is, the synchronous imaging system 100 according to the present exemplary embodiment is capable of processing both still images and moving images.

The control signals 150 to 155 are signals including setting information and synchronous signals for the imaging apparatuses 120 to 125. The synchronous signals here include GenLock signals, Timecode signals and other signals that are pulses for informing accurate imaging intervals to the imaging apparatuses 120 to 125. The imaging apparatuses 120 to 125 capture images in a synchronous timing with reference to the synchronous signals, so that the imaging apparatuses 120 to 125 can capture images with a synchronous imaging time in a constant period.

Figure 2:
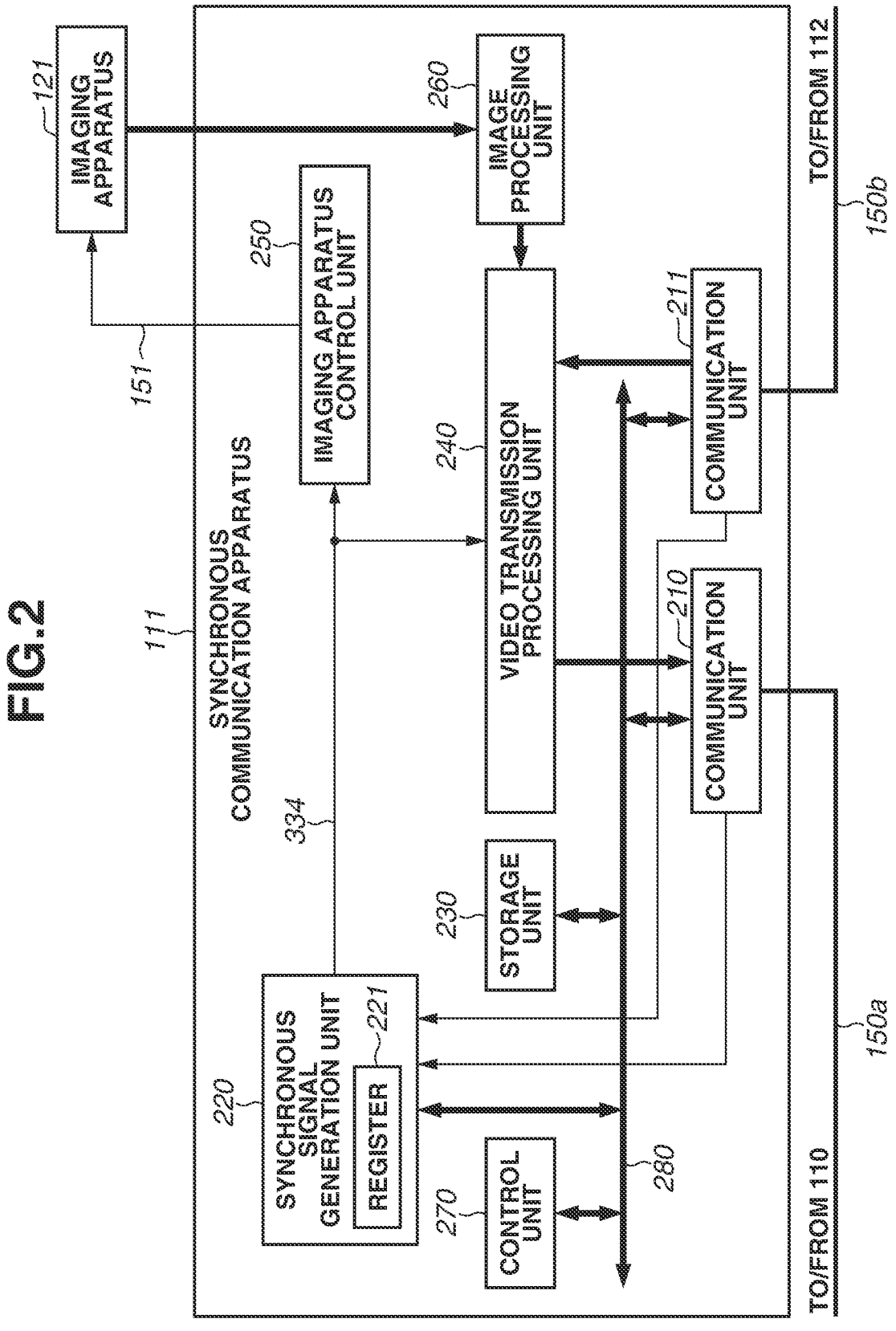
FIG. 2 is a block diagram illustrating a configuration of a synchronous communication apparatus in the synchronous imaging system illustrated in FIG. 1.

FIG. 2 is a block diagram illustrating an internal configuration of the synchronous communication apparatus 111 among the synchronous communication apparatuses 110 to 115 in the synchronous imaging system 100 illustrated in FIG. 1 and its connection to other devices. The synchronous communication apparatus 111 includes a communication unit 210, a communication unit 211, a synchronous signal generation unit 220, a storage unit 230, a video transmission processing unit 240, an imaging apparatus control unit 250, an image processing unit 260, and a control unit 270. These units (210 to 270) are connected together via a system bus 280 to transmit and receive various types of control information, image information and the like to and from one another. In the preceding stage, the synchronous communication apparatus 112 is connected to the synchronous communication apparatus 111 via the communication unit 211 and the network 150b. In the subsequent stage, the synchronous communication apparatus 110 is connected to the synchronous communication apparatus 111 via the communication unit 210 and the network 150a.

The communication units 210 and 211 are communication interfaces configured by using a Media Access Controller (MAC) and a physical layer (PHY).

The communication unit 211 receives image data from the synchronous communication apparatus 112 and transmits the image data to the video transmission processing unit 240. The communication unit 210 receives the image data from the preceding apparatus (the synchronous communication apparatus 112) and the imaging apparatus 121, from the video transmission processing unit 240, and transmits the image data to the synchronous communication apparatus 110 in the subsequent stage. The communication units 210 and 211 acquire accurate time information and timing information via the time synchronization protocol such as PTP, and provide the acquired accurate time information and timing information to the synchronous signal generation unit 220. The time information here refers to a value usable by the synchronous signal generation unit 220 in association with the current time, and the timing information here refers to a signal for notifying the timing to update to the value. If the synchronous communication apparatus 111 is a most distant terminal from the time server 140 in the daisy chain and is star-connected, the communication unit 211 may not be connected to the outside.

The control unit 270 is a central processing unit (CPU) that controls the entirety of the synchronous communication apparatus 111. The control executed by the control unit 270 includes control of a time synchronization sequence defined by the time synchronization standard such as PTP and control of transfer of image packets including the image data received from the synchronous communication apparatus 112 in the preceding stage, for example. The control unit 270 generates a Timecode in the control signal 151 on the basis of the time information obtained from the communication units 210 and 211 via the system bus 280. The control unit 270 transmits control information 335 described below to the synchronous signal generation unit 220. The control unit 270 may be configured by a programmable processor other than a CPU.

The storage unit 230 is a main storage device that can be shared by the units in the synchronous communication apparatus 111, and is mainly configured by using a semiconductor memory such as a dynamic random access memory (DRAM). The storage unit 230 stores various types of information to be handled by the units 210 to 220 and 240 to 270 and control information of the imaging apparatus 121.

The synchronous signal generation unit 220 receives the time information and the timing information from the communication units 210 and 211, and generates pulses 334 that are the base of a synchronous signal described below. The synchronous signal generation unit 220 transmits the pulse 334 to the imaging apparatus control unit 250 and the video transmission processing unit 240. The pulse 334 is a pulse per second (PPS) signal that has accurate intervals and ratios. The synchronous signal generation unit 220 includes a register 221 that sets and stores a threshold for making the pulses 334 uniform in phase via the system bus 280.

The video transmission processing unit 240 generates image packets to be output from the synchronous communication apparatus 111.

The video transmission processing unit 240 packetizes the images captured by the imaging apparatus 121 and sent from the image processing unit 260, and sends the images to the communication unit 210 together with image packets from the synchronous communication apparatus 112 received by the communication unit 211. The video transmission processing unit 240 also receives the pulse 334 from the synchronous signal generation unit 220 and supplies (attaches) a time stamp to the image data received from the image processing unit 260. If the synchronous communication apparatus 111 is the most distant terminal from the time server 140 in the daisy chain and is star-connected, no image packets from the synchronous communication apparatus 110 in the preceding stage need not exist.

The imaging apparatus control unit 250 transmits the control signal 151 to the imaging apparatus 121. The imaging apparatus control unit 250 receives the pulse 334 from the synchronous signal generation unit 220, and generates a synchronous signal in the control signal 151. The imaging apparatus control unit 250 also stores the Timecode received from the control unit 270 in the control signal 151.

The image processing unit 260 performs predetermined image processing on the image data sent from the imaging apparatus 121. The image is captured by the imaging apparatus 121 in synchronization with the synchronous signal in the control signal 151 from the imaging apparatus control unit 250, and the data of the image (image data) is output together with the Timecode from the imaging apparatus 121 to the image processing unit 260. The image processing unit 260 performs necessary image processing (cutting out the background and the foreground) on the received image data, and outputs the processed image data to the video transmission processing unit 240.

The configuration illustrated in FIG. 2 is an example. A plurality of functional blocks may constitute one function block, or any of the functional blocks may be divided into some blocks performing a plurality of functions. One or more of the functional blocks (220, 240, 250, and 260) illustrated in FIG. 2 may be implemented by a programmable processor such as a CPU that is the control unit 270 executing software. At least one of the functional blocks may be implemented as hardware. If the functional blocks are implemented by hardware, a dedicated circuit can be automatically generated on a field programmable gate array (FPGA) by using a predetermined compiler from a program for performing the steps, for example. The functional blocks may be implemented as hardware by forming a gate array circuit as in the case of FPGA.

The functional blocks may be implemented by an application specific integrated circuit (ASIC). If it is described herein that different functional blocks perform operations, the functional blocks may be implemented by the same hardware serving as the subject that performs the operations.

Figure 3:
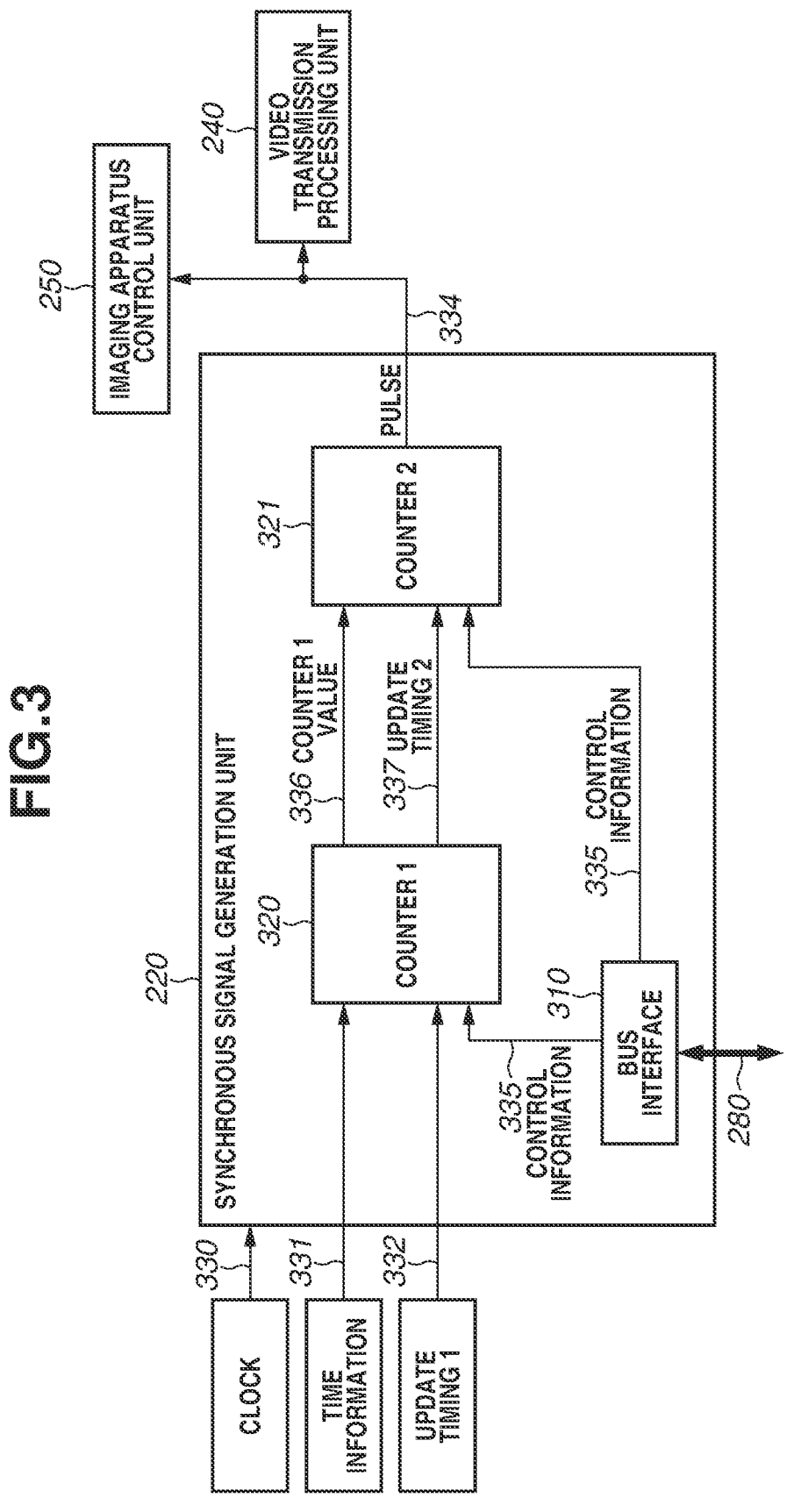
FIG. 3 is a block diagram illustrating a configuration of a synchronous signal generation unit included in the synchronous communication apparatus illustrated in FIG. 2.

FIG. 3 is a block diagram of the synchronous signal generation unit 220 illustrated in FIG. 2. The synchronous signal generation unit 220 includes a counter 1 (320) and a counter 2 (321) that update their own values at a timing of a clock 330 supplied from the outside. The synchronous signal generation unit 220 also includes a bus interface 310 that acquires settings and control information from the bus 280. The synchronous signal generation unit 220 receives time information 331 from the communication units 210 and 211, an update timing 1 (332) that is the update timing of the counter 1 (320), and the clock 330 that actuates the constituent elements. The synchronous signal generation unit 220 also sends the pulse 334 to the video transmission processing unit 240 and the imaging apparatus control unit 250. Herein, the counter 1 will also be referred to as a first counter, and the counter 2 will also be referred to as a second counter.

The bus interface 310 is an interface that communicates with the outside via the system bus 280. Examples of information communicated include initialization information, start instruction, and stop instruction about the counter 1 (320) and the counter 2 (321), a threshold used for updating the counter 2 (321), an offset value for the counter 2 (321), (hereinafter, referred to as "offset value"), and the like. The bus interface 310 transmits these pieces of information as the control information 335 to the counter 1 (320) and the counter 2 (321).

The counter 1 (320) is a free-running counter that is capable of updating the value from the outside, and increments its value by the clock 330 at other timings than the update timing. The counter 1 (320) is notified of the time information 331 and the update timing 1 (332) by the communication units 210 and 211. The value of the counter 1 (320) is rewritten with the value of the time information at the update timing 1 (332) so that the counter 1 (320) synchronizes to the accurate time of the time source.

The counter 2 (321) includes a free-running counter 421 that can update the value from the outside, and increments its value by the clock 330 at other timings than the update timing. The counter 2 (321) generates the pulse 334 based on the incremented value and sends the pulse 334 to the video transmission processing unit 240 and the imaging apparatus control unit 250.

The clock 330 is a clock signal that drives the counter 1 (320) and the counter 2 (321). The counter 1 (320) and the counter 2 (321) increment their own values using the clock signal at other timings than the rewrite timing. The clock 330 is also used for operation of the bus interface 310.

The time information 331 and the update timing 1 (332) are accurate time information and a timing signal notified by the communication units 210 and 211.

The pulse 334 is a phase pulse that is generated on the basis of the value of the counter 2 (321). Since the counter 1 (320) that is the time source of the counter 2 (321) is synchronized with the time information 331 and the update timing 1 (332), the pulses 334 are sent at the same time in the synchronous communication apparatuses 110 to 115 that are synchronized with each other.

The control information 335 is information that is acquired from the control unit 270 via the system bus 280, and includes the time at which the counter 2 (321) is to start a pulse sending process (hereinafter, referred to as "start time"). The start time can be compared with the value of the counter 1 (320). As compared to the value of the counter 1 (320), a large value of the counter 1 (320) means the future, and a small value of the counter 1 (320) means the past. The control information 335 may further contain default values of the counter 1 (320) and the counter 2 (321) in the reset state. In the following description, the value of the counter 1 (320) will be also referred to as "counter 1 value".

A counter 1 value 336 is the value of the internal counter of the counter 1 (320). Until the update timing 1 (332) reaches the counter 1 (320), the counter 1 (320) increments its own value (counter 1 value) by the clock 330, and updates to the value of the time information 331 at the timing of the update timing 1 (332). The value of the time information 331 is also sent as the current time to the counter 2 (321).

Figure 4:
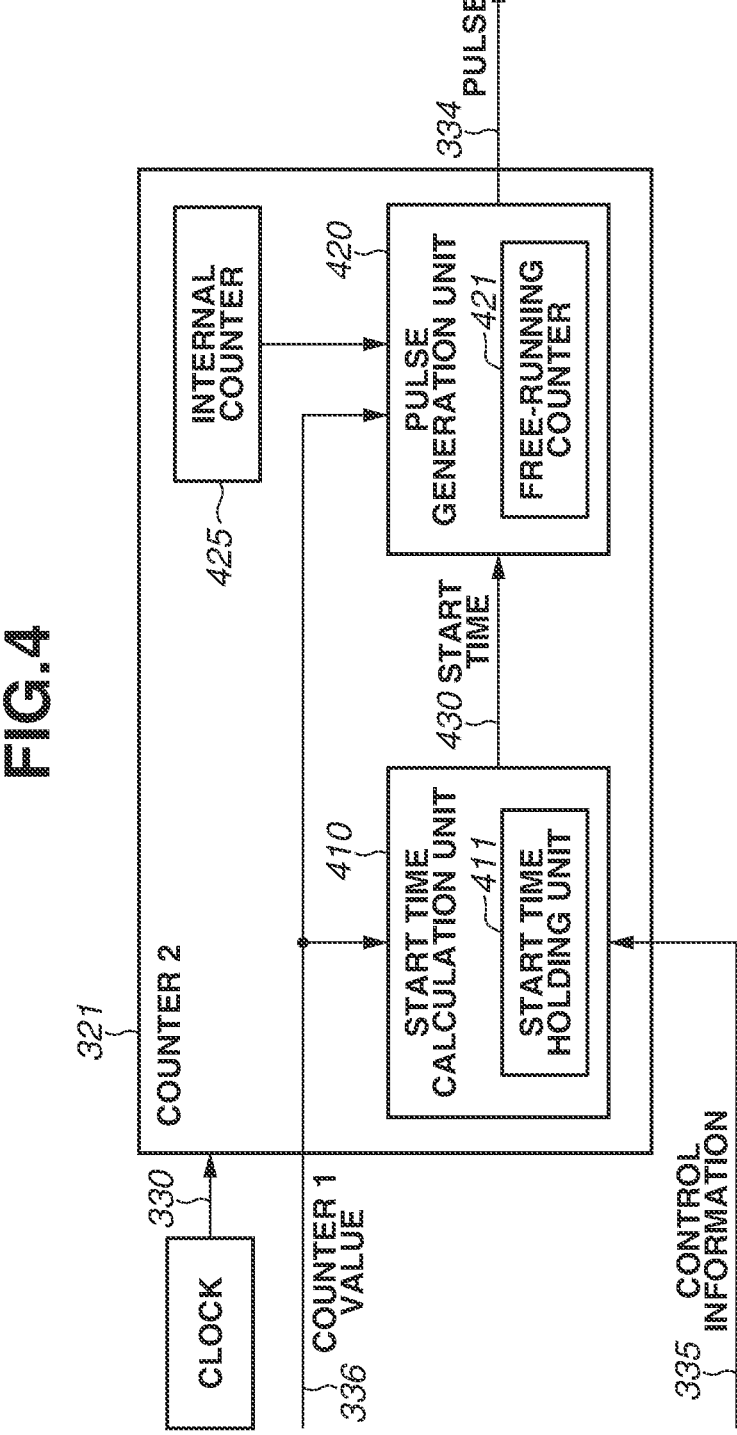
FIG. 4 is a block diagram illustrating a configuration of a second counter included in the synchronous signal generation unit illustrated in FIG. 3.

FIG. 4 is a block diagram of the counter 2 (321) illustrated in FIG. 3. The counter 2 (321) has a start time calculation unit 410, a pulse generation unit 420, and an internal counter 425. The start time calculation unit 410 acquires necessary information from the counter 1 value 336 and the control information 335, and notifies the start time to the pulse generation unit 420. The pulse generation unit 420 generates the pulse 334 with reference to the internal counter 425 and the counter 1 value 336. When the start time information in the control information 335 coincides with the counter 1 value 336, the counter 2 (321) continues to output the pulse 334 starting from a high level.

The start time calculation unit 410 calculates the time at which the pulse generation unit 420 is to start pulse generation, and notifies the calculated time to the pulse generation unit 420. The start time calculation unit 410 internally includes a start time holding unit 411, and receives the start time in the control information 335. If the value of the start time is larger than the counter 1 value 336, the start time calculation unit 410 notifies the value as start time 430 to the pulse generation unit 420. If the value of the start time is smaller than the counter 1 value 336, the start time calculation unit 410 performs calculation described below to determine a value larger than the counter 1 value 336, and notifies the calculated value as the start time 430 to the pulse generation unit 420. The start time holding unit 411 is a memory or a register, for example.

The pulse generation unit 420 internally includes a free-running counter 421, and generates the pulse 334 on the basis of the free-running counter 421 and the counter 1 value 336. The generation of the pulse 334 is stopped at the time of initialization. When the start time 430 notified by the start time calculation unit 410 coincides with the counter 1 value 336, the pulse generation unit 420 starts to generate the pulse 334.

The start time 430 is a signal that indicates the timing for the pulse generation unit 420 to start the initial output of the pulse 334. The start time 430 may be a value that can be compared with the counter 1 value 336, or may be a flag that indicates a high level when the start time has come based on the comparison with the counter 1 value 336 in the pulse generation unit 420.

Figure 5:
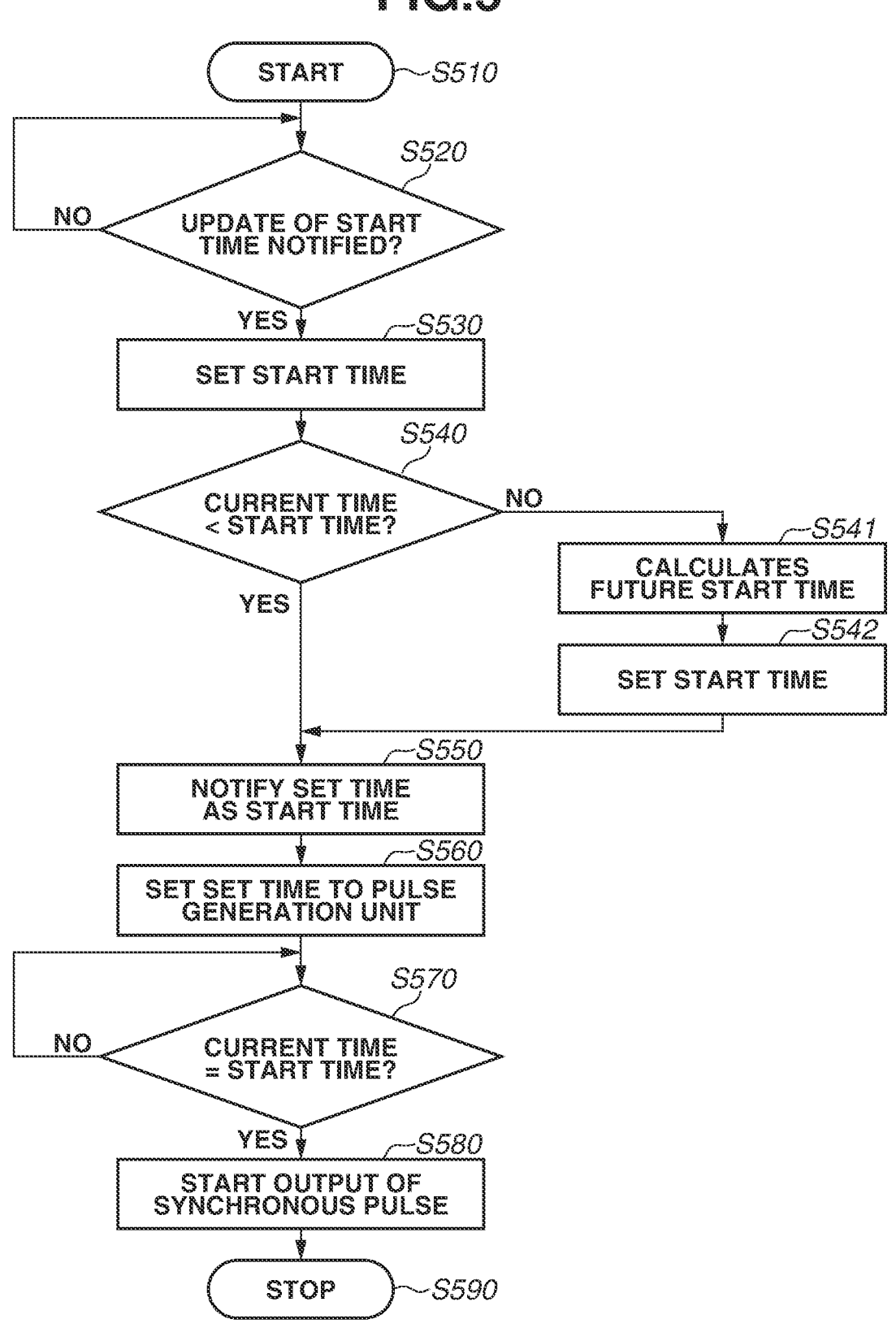
FIG. 5 is a flowchart of a pulse output start process.

FIG. 5 is a flowchart of steps from the activation of the synchronous communication apparatus 111 to the start of the pulse output process in the counter 2 (321) illustrated in FIG. 4. This flowchart mainly includes a step of waiting for notification of the start time, a step of calculating the start time, and a step of waiting for the start time.

In step S510, the operation in the flowchart is started. In step S510, the synchronous communication apparatus 111 is in an activated state as one of the terminals constituting the synchronous imaging system 100 illustrated in FIG. 1.

In step S520, the start time calculation unit 410 determines whether it is notified that the start time information in the control information 335 has been updated. If the start time information in the control information 335 has been updated (YES in step S520), the process proceeds to step S530. If the start time information in the control information 335 has not been updated (NO in step S520), the process returns to step S520.

In step S530, the start time calculation unit 410 records the start time information in the control information 335 into the start time holding unit 411. If the term "recording" appears in the following description, the recording destination may be a memory or a register.

In step S540, the start time calculation unit 410 compares the value obtained in step S530 (the start time recorded into the start time holding unit 411) with the counter 1 value 336. If the value recorded in step S530 (the start time) is larger than the counter 1 value 336 (the current time) (YES in step S540), the process proceeds to step S550. That is, if the start time set to the start time holding unit 411 (the set time) is later than the current time, it is possible to appropriately output a synchronous pulse, and thus the process proceeds to step S550. If the value recorded in step S530 (the start time) is not larger than the counter 1 value 336 (the current time) (NO in step S540), the process proceeds to step S541.

In step S541, the start time calculation unit 410 calculates a new value (a value larger than the counter 1 value 336). The new value is a future start time. That is, if the start time recorded in the start time holding unit 411 is a time that is earlier than or the same as the current time, it is not possible to appropriately output a synchronous pulse. Thus, the start time is re-set. In this case, the re-set start time needs to be a time later than the current time (a future start time). The details of step S541 will be described below.

In step S542, the start time calculation unit 410 records the value calculated in step S541 as a new start time into the start time holding unit 411.

In step S550, the start time calculation unit 410 determines the internal value of the start time calculation unit 410 as the start time, and notifies the start time to the pulse generation unit 420.

In step S560, the pulse generation unit 420 records the start time notified by the start time calculation unit 410 into the pulse generation unit 420.

If the start time (the set time) set as the time at which the pulse generation unit 420 is to start the generation of a synchronous pulse is not later than the current time, the start time is changed to a time later than the current time in steps S541 to S560.

If the start time (the set time) set as the time at which the pulse generation unit 420 is to start the generation of a synchronous pulse is later than the current time, steps S550 and S560 are executed without changing the set time.

In step S570, the pulse generation unit 420 compares the value obtained in step S560 (the start time) with the counter 1 value 336 (the current time). If the value obtained in step S560 coincides with the counter 1 value 336 (YES in step S570), the process proceeds to step S580. That is, in step S570, the pulse generation unit 420 determines whether the time at which the counter 2 (321) is to start the sending process of the pulse 334 has come. If the value obtained in step S560 does not coincide with the counter 1 value 336 (NO in step S570), the process returns to step S570. In step S570, the pulse generation unit 420 waits for the start time (waits until the current time coincides with the start time).

In step S580, the time at which the counter 2 (321) is to start the sending process of the pulse 334 has come, and the pulse generation unit 420 starts to send the pulse 334. Subsequently, the synchronous signal generation unit 220 continuously sends the pulse 334 to the synchronous communication apparatus 110 in the subsequent stage.

In step S590, the operation in the flowchart is ended.

The details of the processing in step S541 (the calculation of the future start time) will be described. First, some symbols will be defined as follows:

$T_{now}$: The current time indicated by the counter 1 value 336

$T_{origin}$: The value recorded in step S530

$T_{elapsed}$: Elapsed time

D: The denominator of frequency of the pulse 334

$P_{now}$: The position of $T_{now}$ in the period $P_{next}$: The time until the timing for sending the next pulse 334

$T_{start}$: Desired start time (future start time)

The step S541 will be described using the above symbols. Step S541 is performed in the following sub-steps (1) to (4):

(1) $T_{origin}$ is subtracted from $T_{now}$ to obtain $T_{elapsed}$, (2) $T_{elapsed}$ is divided by D to obtain $P_{now}$ as the remainder, (3) $P_{now}$ is subtracted from D to obtain $P_{next}$, and (4) $P_{next}$ is added to $T_{now}$ to obtain $T_{start}$.

The operations and processes of the synchronous communication apparatus 111 have been described above. The synchronous communication apparatuses 110 and 112 perform the same operations and processes.

Figure 6:
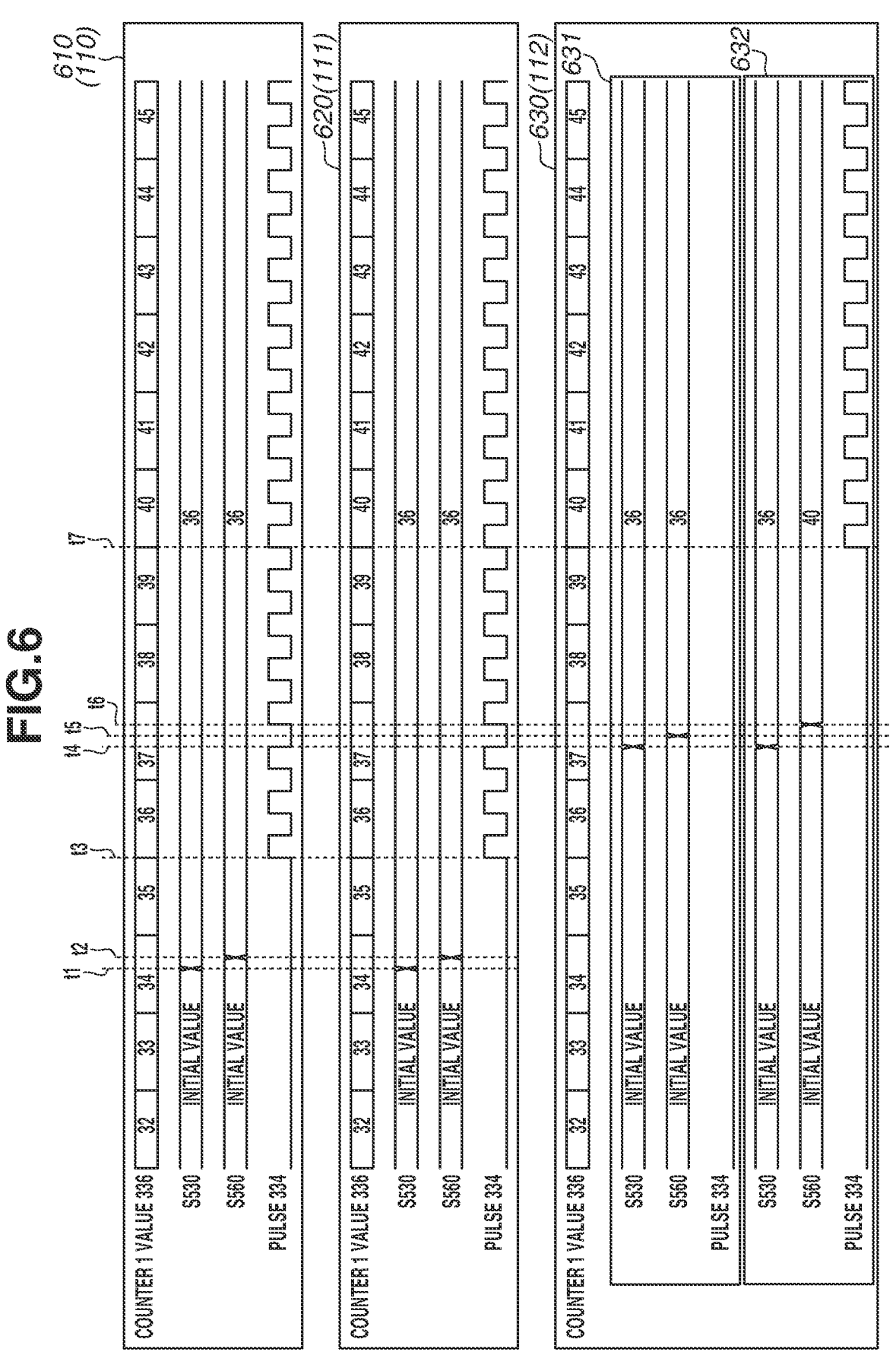
FIG. 6 is a timing chart illustrating the pulse output start process.

FIG. 6 is a diagram illustrating the process from the notification of the start time to the sending of the pulse 334 in the synchronous communication apparatuses 110, 111, and 112 (hereinafter, referred to as "start process"). FIG. 6 illustrates the flow of the start process 610 performed by the synchronous communication apparatus 110, the flow of the start process 620 performed by the synchronous communication apparatus 111 and the flow of the start process 630 performed by the synchronous communication apparatus 112.

In the example of FIG. 6, the synchronous communication apparatuses 110 and 111 start to send the pulses 334 from when the counter 1 value 336 becomes "36", and the synchronous communication apparatus 112 sends the pulse 334 after the start of the sending the pulses 334 by the synchronous communication apparatuses 110 and 111. That is, the synchronous communication apparatuses 110 and 111 are already synchronized with each other. A case where the synchronous communication apparatus 112 is synchronized afterwards (sends the pulse 334) will be described.

The counter 1 values 336 in the synchronous communication apparatuses 110, 111, and 112 are synchronized with each other and become the same numerical value at the same timing.

In the start process 610 of the synchronous communication apparatus 110, the value "36" is specified as the start time by the control information 335 at time t1, and the value "36" is recorded into the start time holding unit 411 of the start time calculation unit 410 in step S530. At this time, since the counter 1 value 336 is "34" that is smaller than the specified time "36", the result of the determination in step S540 is YES, and in step S550, the start time calculation unit 410 notifies the value "36" as the start time 430 to the pulse generation unit 420.

Time t2 is a timing at which the start time 430 is set to the pulse generation unit 420 in step S560. In step S570, the pulse generation unit 420 waits for the value of the counter 1 value 336 to reach "36". In step S580, the counter 1 value 336 coincides with the start time 430 at a time t3 and the synchronous communication apparatus 110 starts to send the pulse 334.

Since the counter 1 value (the current time) 336 is smaller than the specified start time "36" in the start process 620 of the synchronous communication apparatus 111 (YES in step S540), the synchronous communication apparatus 111 sends the pulse 334 at the same timing (the time t3) as the synchronous communication apparatus 110 in the same flow as in the start process 610.

The start process 630 of the synchronous communication apparatus 112 includes two processes 631 and 632.

The process 631 indicates steps S530 and S560 and changes in the pulse 334 in a case where the start time is specified by a conventional technique without using the start time calculation unit 410. In step S530, at a time t4, the synchronous communication apparatus 112 obtains the value "36" as the start time at or after the time at which the synchronous communication apparatuses 110 and 111 start to output. In step S560, at a time t5, the pulse generation unit 420 obtains the value "36" as the start time, and waits for the counter 1 value 336 to reach "36". However, since the counter 1 value 336 does not reach "36", the pulse 334 is not sent.

The process 632 indicates the operation of the synchronous communication apparatus 112 in the case of using the start time calculation unit 410. In the present exemplary embodiment, the next timing at which the phases of the synchronous pulses become the same phase is when the counter 1 value 336 reaches "40", and the timing at which the phases of the synchronous pulses become the same phase after "40" is when the counter 1 value 336 reaches "44".

At the time t4, the synchronous communication apparatus 112 obtains the value "36" that is the start time. Since the value "36" is smaller than the counter 1 value 336 of "37", the result of the determination in step S540 is NO and the process proceeds to step S541. In step S541, at a time t6, the new start time is calculated as "40", and in step S560, the value "40" is set to the pulse generation unit 420. At a time t7, the counter 1 value 336 of "40" coincides with the value "40" set in step S560, and the synchronous communication apparatus 112 starts to send the pulse 334. This is the timing at which the pulses 334 of the synchronous communication apparatuses 110 and 111 shift from a low level to a high level, and the pulse 334 of the synchronous communication apparatus 112 also shifts from a low level to a high level and are started to be output. Thus, the same pulses 334 are sent from the synchronous communication apparatuses 110, 111, and 112.

In this manner, in the process 632, if the start time (the set time) at which the pulse generation unit 420 is to start the generation of the pulse 334 is not a time (a future time) later than the counter 1 value 336 that is the current time, the start time is changed to a time later than the current time.

The time t4 and time t6 are times at which the pulse 334 is in the low level. That is, the output (obtaining) of the current time from the counter 1 and the calculation of the new start time "40" (change of the set time) are performed in a time frame in which the synchronous pulse is not changed in one period of the synchronous pulse. More specifically, the output (obtaining) of the current time from the counter 1 and the calculation of the new start time "40" are performed at an intermediate timing in the period of the synchronous pulse, for example.

As described above, according to the present exemplary embodiment, while the plurality of synchronous communication apparatuses 110 and 111 outputs synchronous pulses, the synchronous communication apparatus 112 to be synchronized afterwards (to be added afterwards) can output the same synchronous pulse as those of the other synchronous communication apparatuses 110 and 111. In the case of step S631, the synchronous communication apparatus 112 to be synchronized afterwards cannot output a synchronous pulse, and the synchronous pulse output process needs to be performed again on all the synchronous communication apparatuses 110 to 112 including the other synchronous communication apparatuses 110 and 111. In the present exemplary embodiment, such a phenomenon will not occur. Therefore, according to the present exemplary embodiment, the synchronous communication apparatus 112 can be efficiently synchronized with the other synchronous communication apparatuses 110 and 111.

Next, a second exemplary embodiment of the present disclosure will be described with reference to FIG. 7. In the following description, components and processes similar to those in the first exemplary embodiment will be given the same reference signs as those in the first exemplary embodiment. The timing chart illustrated in FIG. 7 corresponds to the timing chart illustrated in FIG. 6 according to the first exemplary embodiment.

Figure 7:
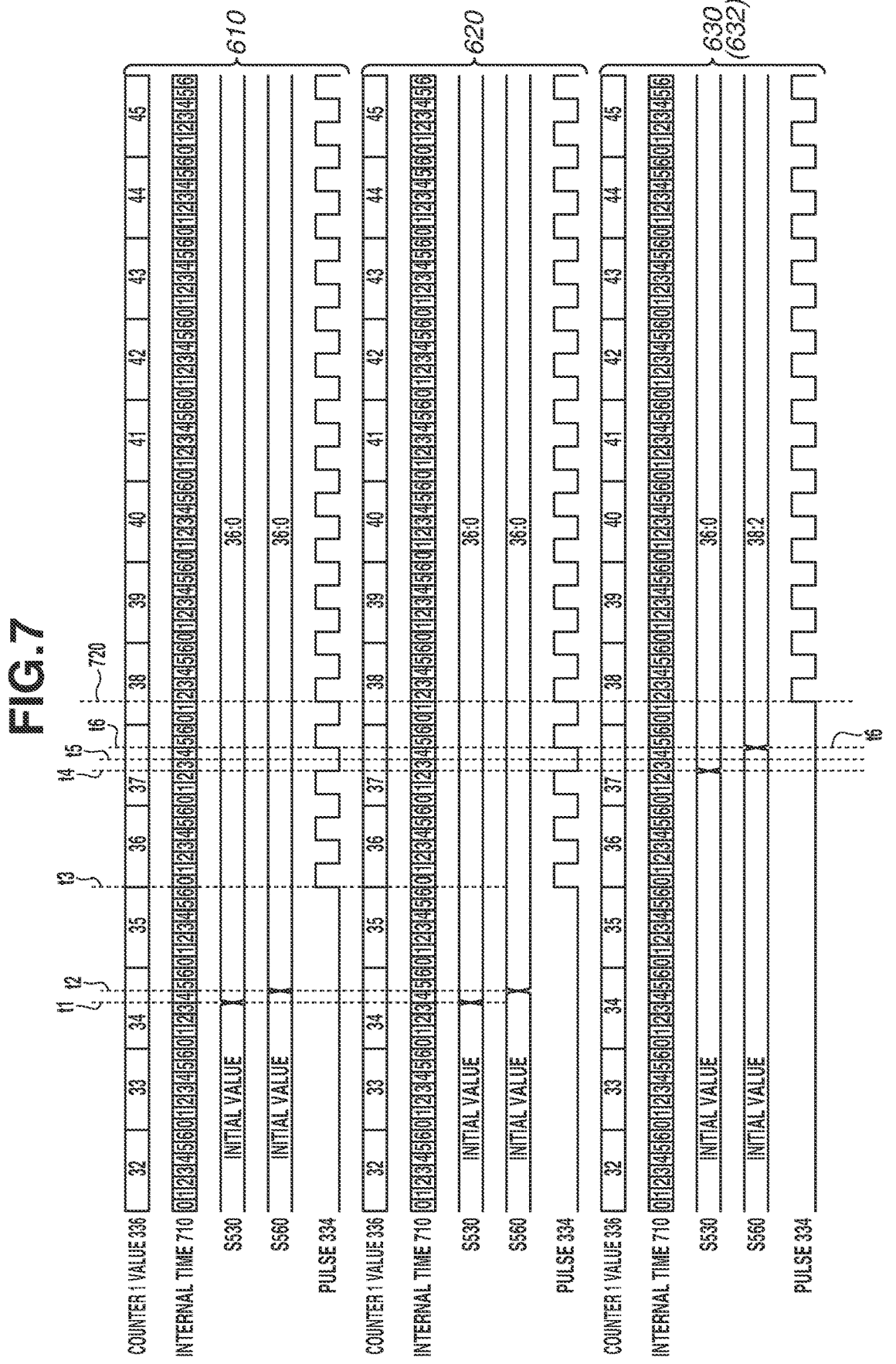
FIG. 7 is a timing chart illustrating a pulse output start process according to a second exemplary embodiment.

FIG. 7 is a diagram illustrating start processes performed by the synchronous communication apparatuses 110, 111, and 112 illustrated in FIG. 1. Basic configurations and processes in the second exemplary embodiment are the same as those illustrated in FIGS. 1 to 5, and differences in the processes from FIG. 6 will be described. In the second exemplary embodiment, an internal time 710 is used in addition to the counter 1 value 336. The internal time 710 may be generated inside the synchronous signal generation unit 220 or may be acquired from the outside.

The internal time 710 is a time that is updated more finely than the counter 1 value 336. In the example of FIG. 7, the internal time 710 is counted up to 6 while the counter 1 value 336 is incremented by one. After reaching 6, the internal time 710 is reset to 0 while the counter 1 value 336 is incremented by one. That is, the internal time 710 is a time in a unit finer than the minimum unit of the current time (the counter 1 value 336) received by the synchronous communication apparatus 112 from the synchronous communication apparatus 111.

While. in the first exemplary embodiment, the time is represented by the counter 1 value 336 (for example, "36"), in the second exemplary embodiment, the time is represented by a combination of the value of the counter 1 value 336 and the internal time 710. For example, if the value of the counter 1 value 336 is "36" and the value of the internal time 710 is "0", the current time is represented by "36:0", and if the counter 1 value 336 is "36" and the value of the internal time 710 is "2", the current time is represented by "36:2"

In the second exemplary embodiment, the start time calculation unit 410 performs a process (calculation) described below in step S541 of FIG. 5. The definitions of symbols are as follows:

$T_{now}$: The current time indicated by the counter 1 value 336

$T_{origin}$: The value recorded in step S530

$T_{elapsed}$: Elapsed time

D: The denominator of frequency of a pulse 334

$P_{now}$: The position of $T_{now}$ in a period $T_{freq}$: The period of the pulse 334

$N_{pulse}$: The number of the pulses 334 included in $P_{now}$ $T_{start}$: Desired start time Step S541 will be described using the above symbols. Step S541 is performed in the following sub-steps (1), (2), (3a), and (4a):

(1) $T_{origin}$ is subtracted from $T_{now}$ to obtain $T_{elapsed}$.

(2) $T_{elapsed}$ is divided by D to obtain $P_{now}$ as the remainder.

(3a) $P_{now}$ is divided by $T_{freq}$ to obtain $N_{pulse}$.

(4a) $T_{freq}$ is multiplied by ($N_{pulse}$+1) and added to $T_{now}$ to obtain $T_{start}$.

In the process 630 (632), at a time t4, the synchronous communication apparatus 112 obtains "36:0" as a start time. Since the start time "36:0" is smaller than a combination "37:3" of "37" as the value of the counter 1 value 336 and "3" as the value of the internal time 710, the result of the determination in step S540 is NO and the process proceeds to step S541. In step S541, at a time t6, the new start time is calculated as "38:2", and in step S560, the value "38:2" is set to the pulse generation unit 420. Therefore, 38:2 is set as a start time 430.

At a time 720, the combination "38:2" of "38" as the value of the counter 1 value 336 and "2" as the value of the internal time 710 coincides with the value "38:2" set in step S560, and the synchronous communication apparatus 112 starts to send the pulse 334. This is the timing at which the pulses 334 of the synchronous communication apparatuses 110 and the synchronous communication apparatus 111 shift from a low level to a high level, and the pulse 334 of the synchronous communication apparatus 112 shifts from a low level to a high level and is started to be output. Thus, the same pulses 334 are sent by the synchronous communication apparatuses 110, 111, and 112.

As described above, in the present exemplary embodiment, a time 720, not the time t7 (FIG. 6), is the output start time for the synchronous communication apparatus 112 to start to output the pulse 334. The start time 430 is calculated as 38:2, and the counter 1 value 336 becomes "38". At the timing at which and the internal time 710 becomes "2", the pulse generation unit 420 starts to output the pulse 334.

In the second exemplary embodiment, when the process proceeds to step S541, the time at which the pulse is started to be output (the set time) is changed in a unit finer than the minimum unit of the counter 1 value 336 which is the current time in the first exemplary embodiment.

As described above, according to the second exemplary embodiment, while the plurality of synchronous communication apparatuses 110 and 111 output synchronous pulses, the synchronous communication apparatus 112 added afterwards can output the same synchronous pulse as those of the other synchronous communication apparatuses 110 and 111. Although the sending of the pulse 334 is started at the time t7 in the first exemplary embodiment, the sending of the pulse 334 is started at the time 720 earlier than the time t7 in the second exemplary embodiment. Accordingly, the synchronous communication apparatus 112 can output the same synchronous pulse as those of the other synchronous communication apparatuses 110 and 111 at an earlier timing.

Modification 1

In the first and second exemplary embodiments, if the start time set as the time at which generation of a synchronous pulse is started is not a time later than the current time, the start time is changed to a time later than the current time in steps S541 to S560. Then, when the current time reaches the changed start time in step S570, the output of the synchronous pulse is started in step S580. The present disclosure is not limited to these exemplary embodiments.

For example, if the result of the determination in step S540 is NO, a step to be executed in parallel to steps S541 to S560 may be added in some cases. For example, if a difference in phase between the synchronous pulse output from the pulse generation unit 420 of the synchronous communication apparatus 112 at the set start time and the synchronous pulses output from the pulse generation units 420 of the synchronous communication apparatuses 110 and 111 falls within an allowable range, another process may be performed in parallel. The allowable range covers phase differences of about 1% and less, for example. This will be described with reference to the process 632 in FIG. 6. If the result of the determination in step S540 at the time t4 is NO, the value "40" is set and the time at which the synchronous pulse can be output before the value "40" is calculated in the parallel process. If the value of the time is "39", the pulse generation unit 420 of the synchronous communication apparatus 112 outputs the pulse 334 at the time "39". That is, if the result of the determination in step S540 is NO, first, it is determined whether the phase difference between the synchronous pulses falls within a predetermined allowable range. If the phase difference falls within the predetermined allowable range, a nearest future time (earliest time) "39" which can be obtained by starting the calculation from the value "37" of the counter 1 value 336, to which the time t4 belongs, is set as the "start time". In this case, at the value "39", the synchronous pulses with a phase difference are output. Then, when the value reaches "40", the synchronous pulses without a phase difference are output.

Modification 2

In the process 632 according to the first exemplary embodiment, at the time t4, the value "36" that is the start time is obtained, the result of the determination in step S540 is NO, the new start time is calculated as "40" at the time t6 in step S541, and the value "40" is set to the pulse generation unit 420 in step S560. However, in the actual process, a certain amount of time is required to obtain the value "36" and calculate and set the value "40", and thus the current time may have already exceeded "40" when the determination in step S570 is attempted. In this case, since the sending of the pulse 334 cannot be started at the value "40", the value "44" that is the next timing at which the phases become the same phase is set as the start time. That is, if the calculated time "40" is close to the current time (if the difference between the calculated time "40" and the current time is equal to or smaller than a predetermined value), the sending of the pulse 334 may be started at the next timing when the phases become the same phase.

Other Embodiments

The exemplary embodiments of the present disclosure can be implemented as, for example, a system, an apparatus, a method, a program and a storage medium. Specifically, the exemplary embodiments of the present disclosure can be applied to a system constituted by a plurality of devices (e.g., a host computer, an interface device, a web application) and can be applied to an apparatus constituted by a single device.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-201878, filed Dec. 19, 2022, which is hereby incorporated by reference herein in its entirety.

What is claimed is:

1. A synchronous communication apparatus comprising:
a processor; and
a memory in communication with the processor, the memory storing instructions that, when executed by the processor, cause the processor to:

output a current time for synchronizing with another communication apparatus;

generate a synchronous pulse at a predetermined frequency; and if a set time that is set as a time at which the generation of the synchronous pulse starts, is not a time later than the current time, change the set time to a time later than the current time, wherein outputting the current time and changing the set time are performed in a time frame in which the synchronous pulse does not change in one period of the synchronous pulse.

2. The synchronous communication apparatus according to claim 1, wherein if the set time is a time later than the current time, the set time is not changed.

3. The synchronous communication apparatus according to claim 1, wherein if the set time is not a time later than the current time, the set time is changed so as to be in a same phase as a synchronous pulse output by the another communication apparatus.

4. The synchronous communication apparatus according to claim 1, wherein if the set time is not a time later than the current time, the set time is changed to a time obtained by calculation using a denominator of a frequency of the synchronous pulse.

5. The synchronous communication apparatus according to claim 1, wherein if the set time is not a time later than the current time, the set time is changed in a unit finer than a minimum unit of the current time output.

6. The synchronous communication apparatus according to claim 1, wherein if the set time is not a time later than the current time and a difference in phase between a synchronous pulse output from the another communication apparatus and a synchronous pulse output at the set time falls within an allowable range, the synchronous pulse is output at a time earlier than the changed set.

7. The synchronous communication apparatus according to claim 6, wherein when the current time reaches the changed set time, the synchronous pulse is output in a same phase as the synchronous pulse output by the another communication apparatus.

8. The synchronous communication apparatus according to claim 1, wherein if a difference between the changed set time and the current time is equal to or smaller than a predetermined value, the synchronous pulse is output at a timing at which a same phase is achieved after the changed set time.

9. A control method of a synchronous communication apparatus configured to output a current time for synchronizing with another communication apparatus and configured to generate a synchronous pulse at a predetermined frequency, the control method comprising:

generating the synchronous pulse at the predetermined frequency; and if a set time that is set as a time at which generation of the synchronous pulse starts, is not a time later than the current time, changing the set time to a time later than the current time, wherein outputting the current time and changing the set time are performed in a time frame in which the synchronous pulse does not change in one period of the synchronous pulse.

10. A non-transitory storage medium storing a program causing a synchronous communication apparatus configured to output a current time for synchronizing with another communication apparatus and configured to generate a synchronous pulse at a predetermined frequency to execute a control method, the control method comprising:

generating the synchronous pulse at the predetermined frequency; and if a set time that is set as a time at which generation of the synchronous pulse starts, is not a time later than the current time, changing the set time to a time later than the current time, wherein outputting the current time and changing the set time are performed in a time frame in which the synchronous pulse does not change in one period of the synchronous pulse.

* * * * *